Oct. 26, 1926.   1,604,409
G. GRINDROD
METHOD OF MEASURING THE VISCOSITY OF LIQUID OR LIQUIFORM MATERIALS
Filed July 24, 1920   3 Sheets-Sheet 1
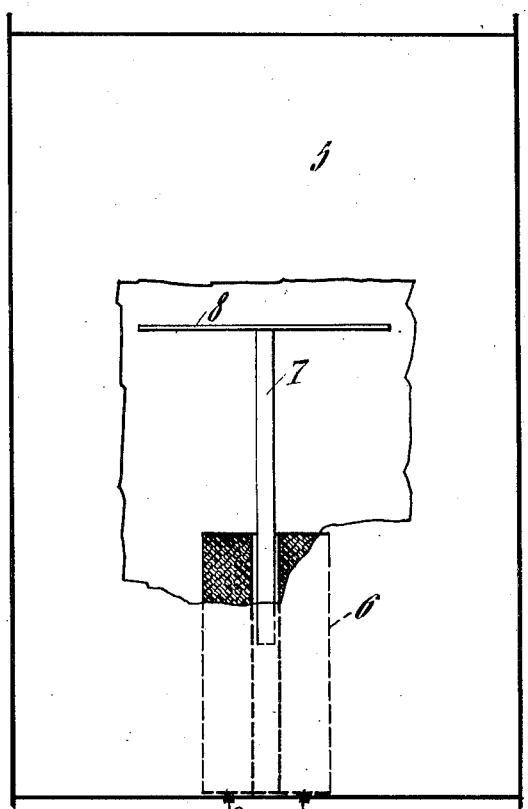
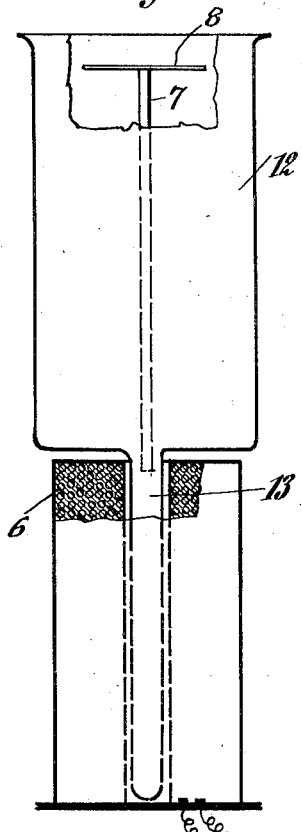
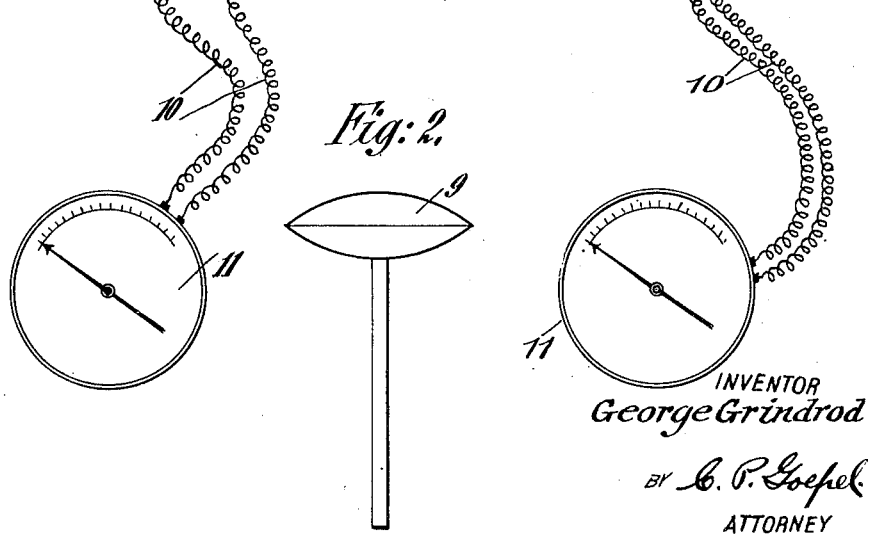
INVENTOR
George Grindrod
BY C. P. Goepel
ATTORNEY Oct. 26, 1926.
G. GRINDROD
1,604,409
METHOD OF MEASURING THE VISCOSITY OF LIQUID OR LIQUIFORM MATERIALS
Filed July 24, 1920
3 Sheets-Sheet 2
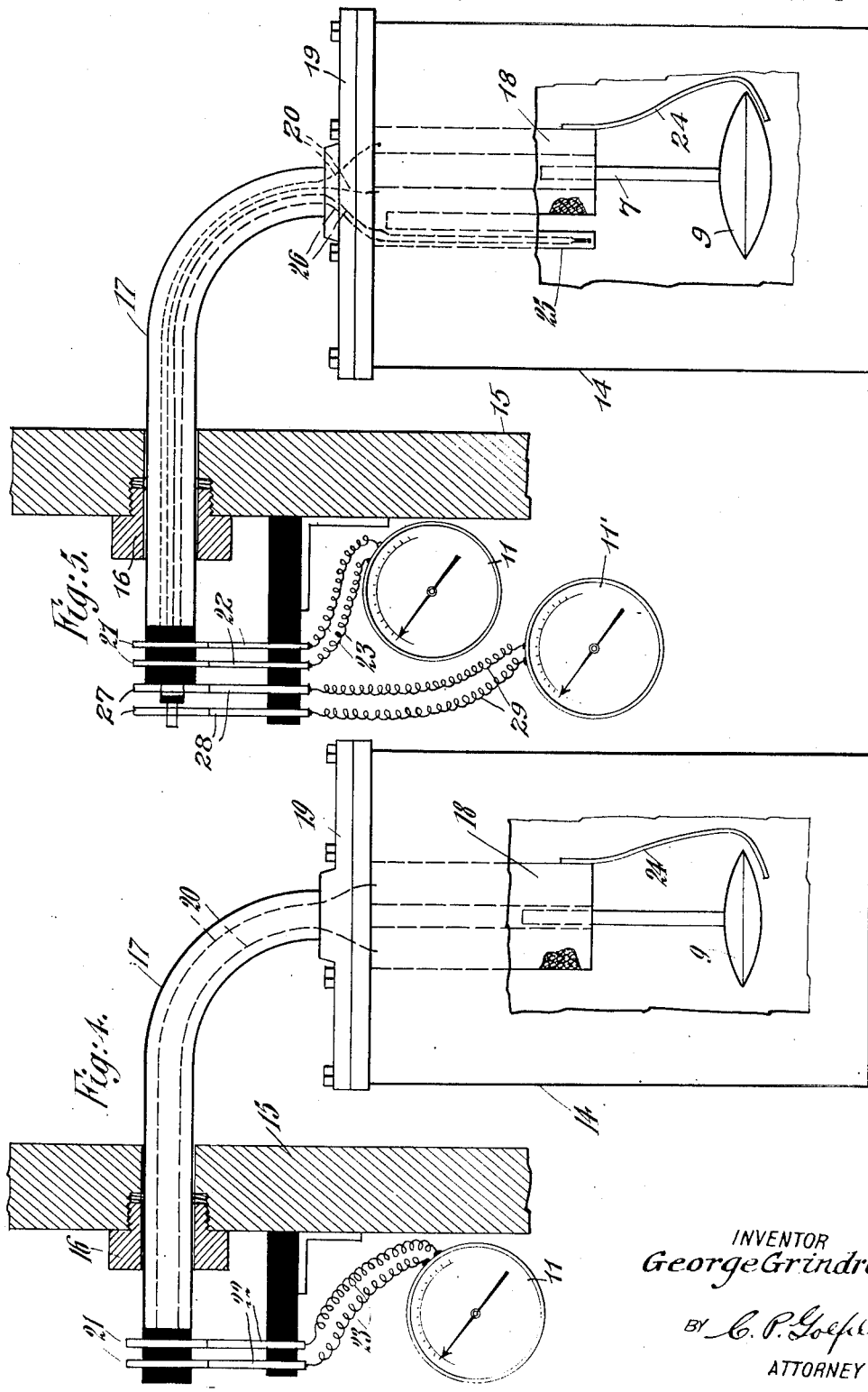
INVENTOR
*George Grindrod*
BY *C. P. Goepel*
ATTORNEY Oct. 26, 1926.
G. GRINDROD
1,604,409
METHOD OF MEASURING THE VISCOSITY OF LIQUID OR LIQUIFORM MATERIALS
Filed July 24, 1920   3 Sheets-Sheet 3
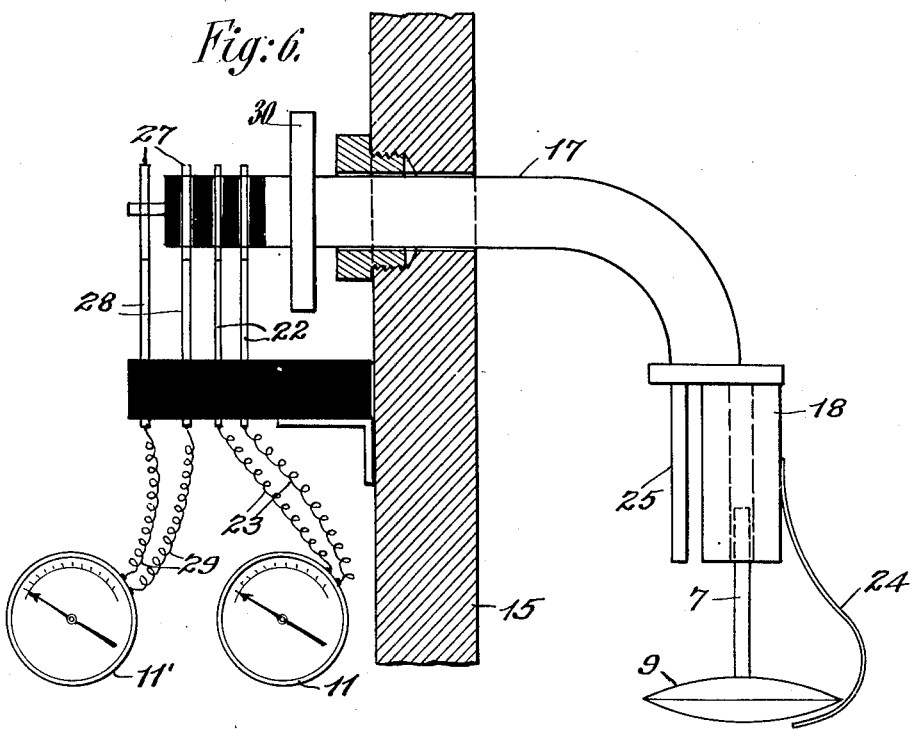
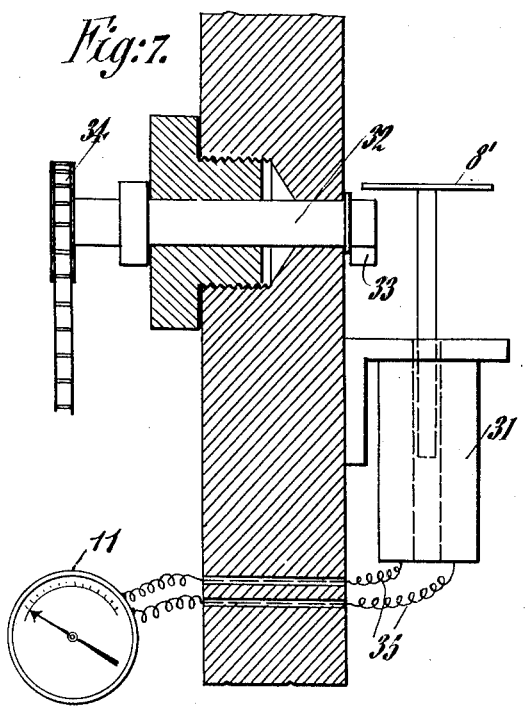
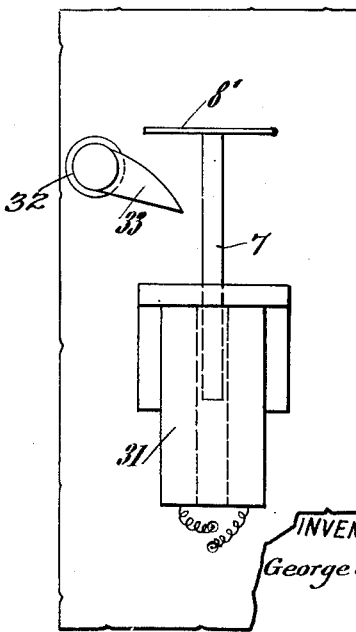
INVENTOR
George Grindrod
BY C. P. Goepel.
ATTORNEY Patented Oct. 26, 1926.

1,604,409

UNITED STATES PATENT OFFICE.

GEORGE GRINDROD, OF OCONOMOWOC, WISCONSIN, ASSIGNOR TO CARNATION MILK PRODUCTS COMPANY, OF OCONOMOWOC, WISCONSIN, A CORPORATION OF DELAWARE.

METHOD OF MEASURING THE VISCOSITY OF LIQUID OR LIQUIFORM MATERIALS.

Application filed July 24, 1920. Serial No. 398,830.

This invention relates to an improved method for measuring the viscosity of liquids.

Heretofore the viscosity of liquids or liquiform materials has been ascertained or measured by one of three general types of apparatus. First, the liquid has been caused to flow through a tube or past an obstruction under a constant known pressure, and the time required for a certain amount of the liquid to pass the obstruction, or flow through the tube measured. In other words, in this apparatus the measurement is made of the amount of liquid which passes a fixed resistance during a definite increment of time. In another type of apparatus or viscosimeter the measurement of the viscosity depends upon the rotation of a body of the liquid, and measuring the torque which may be transmitted by this rotating liquid body to a ball or disc suspended therein.

In a third type of viscosimeter the ball or disc is rotated within the body of the liquid under the application of a known force, and the retardation offered to the rotating movement of the ball or disc is measured as the viscosity of the liquid. Thus it will be seen that the principle involved in the first type of apparatus relates to the measurement of the time rate of flow of the liquid under a fixed condition, while the second and third types of apparatus are based upon a different principle, namely, the measurement of the resistance offered by the liquid to the movement of a body within the liquid.

It will be at once obvious that for numerous reasons these various types of viscosimeters cannot be depended upon for absolute accuracy, and it is, therefore, the primary object and purpose of my present invention to provide a method and apparatus for the electrical indication of the viscosity of liquids which will be highly accurate and reliable for all practical purposes, such, for instance, as in the processing of milk and other liquid or liquiform food products.

In viscosimeters of the several types above referred to the viscosity of the liquid has been determined by timing the rate of flow of the liquid with a stop watch or similar device. Such mechanism and means of measuring or ascertaining the viscosity of liquids are, therefore, open to human error, and cannot be depended upon. Therefore, I propose to provide a viscosimeter wherein the viscosity of the liquid is exactly measured, and such measurement definitely and precisely indicated by the electrical operation of a galvanometer or similar indicating instrument.

In practice I contemplate the use of two general types of electrical viscosimeters, the first of which comprises an instrument for indicating individual or single measurements of viscosity, and in this respect is used in a similar manner to other viscosimeters.

In the second type of apparatus employing the same principle of operation as the first, continuous indications of the viscosity of the liquid or liquiform material undergoing a process treatment may be maintained throughout any desired period of time, and the indicating instruments may be placed at any desired distance from the place of treatment of the material. Thus this second type of instrument may be advantageously employed in connection with food products and other liqui-form materials which are undergoing a chemical treatment within an autoclave or the like, thus enlarging the field of industrial utility for apparatus of this type.

The present invention also comprehends an improved method and apparatus primarily designed for use in the chemical treatment of milk products, whereby continuous concurrent indications of variations in both the temperature and viscosity of the products will be given throughout the treatment process. In the accomplishment of this desirable result I propose to arrange a thermocouple within the auto-clave or similar container for the product either as an integral part of the viscosimeter, or disassociated therefrom, and connect said thermocouple to a potentiometer or other electrical indicating instrument. In the processing of certain food products the use of the viscosimeter may not be necessary or desirable, and, therefore, it is to be considered within the purview of my invention to employ the thermocouple independently of the viscosimeter for the purpose of indicating variations in temperature of the product which may occur during the treatment processing.

In the accompanying drawings I have illustrated several forms of apparatus, but in each case, for the purpose of accurately indicating viscosity I preferably use a galvanometer, since, as is well known, this instrument may be rendered very sensitive to electrical impulses, and I may, therefore, employ a solenoid and magnet constituting essential elements of the viscosimeter which are of very small dimensions, and yet produce sufficient current to insure the accuracy of the measurement.

Generally considered I aim to provide a method and apparatus for the purpose above referred to, which may be readily installed for use in connection with processing equipment, which requires little or no adjustment or attention upon the part of the operator, and which will be uniformly reliable in the results achieved.

With the above and other objects in view, I have illustrated in the accompanying drawings several satisfactory and practical embodiments of apparatus for carrying out the methods to be hereinafter explained.

In the accompanying drawings:

Figure 1 is an elevation partly broken away, illustrating one application of the viscosimeter applied to a liquid testing vessel or container.

Figure 2 is a detail elevation showing a modified form of the magnet.

Figure 3 is an elevation partly broken away, illustrating an embodiment of the invention particularly designed for laboratory use.

Figure 4 is a sectional view through the wall of an autoclave, illustrating an embodiment of the apparatus adapted for the continuous indication of viscosity.

Figure 5 is a similar view showing an apparatus for the purpose of simultaneously indicating the viscosity and temperature of the liquid being treated.

Figure 6 is a sectional view through an autoclave showing a similar embodiment of the apparatus for treating the liquid or liquiform material in bulk.

Figure 7 is a sectional view through the wall of the autoclave, and showing a mechanical means for actuating the magnet of the viscosimeter when the latter is arranged in fixed relation to the wall of the autoclave, and, Figure 8 is a detail elevation of the viscosimeter looking at right angles to Figure 7.

In the drawings, similar reference characters designate corresponding parts throughout the several views.

Referring in detail to the drawings, and more particularly to Figure 1 thereof, 5 designates a can or other suitable container for holding a sample of the liquid or liquiform material to be tested. Within the lower portion of the can, and preferably attached to the bottom thereof, a solenoid 6, of insulated wire, is arranged. 7 designates a permanent magnet of greater length than the solenoid, and of such diameter that it may move freely within the tube upon which the solenoid coil is wound, in an axial direction. To the upper end of the magnet rod 7 a disc 8 is permanently fixed. This disc may consist of a foraminous plate or of wire mesh fabric, though if desired in lieu of such a disc, a hollow, more or less spherical body 9, shown in Figure 2, may be fixed to the upper end of the magnet so as to increase its buoyancy. From the terminals of the solenoid 6 the insulated wires 10 extend to a sensitive galvanometer or other indicating instrument 11.

Assuming that the magnet carrying the disc 8 is placed within the liquid or liquiform material contained in the vessel or container 5, it will fall through the liquid at a rate which is solely dependable upon the viscosity thereof. The disc is moved by a constant force, namely its weight, while such movement is impeded by the constant resistance of the material. If the magnet is so placed that it falls freely through a solenoid, which is of a length considerably greater than its diameter, the magnet rod will pass a definite number of turns of the solenoid per second, such number depending wholly upon the viscosity of the liquid. If the magnet, therefore, has a pole strength of 100 lines of force, and there are one hundred and fifty turns of wire per cm. length of the solenoid, and the magnet falls at the rate of X cm. per second, an E. M. F. of fifteen thousand X absolute units will be generated in the solenoid. For any instrument the pole strength 100 and the turns of wire per cm., 150 are constant, the only variable being the rate of movement X. It follows, therefore, with any instrument having a magnet of certain weight, and disc of certain dimensions, the rate of movement X is dependable solely upon the viscosity of the liquid.

Having provided a galvanometer graduated in units of E. M. F., and having a scale covering a range as required to register such E. M. F. as may most probably be produced in the testing of such liquids, the magnet, with its disc, is allowed to fall through the solenoid. Since the solenoid is relatively long, and the disc of such size that the descent of the magnet is retarded, and its movement comparatively slow, that is, at a rate not exceeding say, ten cm. per second, the galvanometer needle is deflected and held for an appreciable time at a point depending upon the viscosity of the liquid. The reading of the galvanometer indicates the viscosity of the liquid at the time the magnet passes through it.

Instead of graduating the galvanometer in units of E. M. F. or millivolts, it may be graduated in units of absolute viscosity for the particular solenoid magnet and disc with which it is to be used. However, the preferred method of graduating the galvanometer is to use an arbitrary scale. More than one solenoid may be provided, but the windings of these solenoids will be identical. A series of magnet discs is provided, representing a series of ranges of viscosity. For thin, or relatively non-viscous liquids a larger disc is used, so as to slow up the descent or gravity movement of the magnet, whereas, for relatively thick, viscous liquids, smaller discs are employed. Each magnet disc is then calibrated and marked with the number of units of viscosity represented by each scale division when it is used.

The foregoing method of indicating the time rate of movement of a body through a liquid has decided advantages over the stop watch and other mechanical indicating methods heretofore in vogue, as above referred to. The measurement by the galvanometer is theoretically correct, and by shortening the scale range, the accuracy may be increased any desired degree for a limited range. However, for practical measurements to such degree of accuracy as usually is obtained by viscosimeters, a wide range of viscosity is measurable without interchange of the magnet discs of variable diameters and weights. By providing these several calibrated magnet discs, all possible ranges of viscosity may be covered by a single instrument.

The apparatus which I have just referred to not only has the advantage of providing a theoretically correct measurement of viscosity, but also the further advantage of extreme simplicity and great rapidity of operation.

In Figure 3 of the drawings I have illustrated another type of apparatus particularly designed for general laboratory use. This instrument is provided with a glass cylinder 12 of special construction for holding the liquid to be tested. The upper part of this jar or cylinder is of relatively large diameter in order to admit the disc magnet, while the lower portion of said cylinder is of relatively small diameter, so as to easily fit within the core of the solenoid, as indicated at 13. In other respects the instrument is of substantially the same construction and arrangement as previously described.

In the practical use of the construction shown in Figure 3, the jar or cylinder is filled with the liquid, and the lower, smaller portion 13 thereof is set within the core of the vertically disposed solenoid. The disc magnet is then allowed to fall through the liquid in the cylinder, and the reading of viscosity taken from the scale of the galvanometer. This arrangement, it will be noted, avoids the necessity of placing the solenoid in the liquid, and permits the use of a number of jars or cylinders 12 containing different samples to be tested, without moving the solenoid, or cleaning it.

In Figure 4 of the drawings I have illustrated a type of apparatus which is designed for the continuous indicating of viscosity.

Among other industrial applications of an indicating or recording viscosimeter may be mentioned the sterilization of evaporated milk. Heretofore in the sterilization of evaporated milk, a series of samples of each batch to be sterilized have first been taken from the bulk of the milk and sterilized at various temperatures, and for various lengths of time until a sample was produced having the desired viscosity. The remainder of the milk from which that particular sample was taken would then be sterilized at a temperature and time as near as possible as that used for the sample. However, in practice it has always been found impossible to exactly duplicate any time or temperature given to a sample of milk, and more or less variation has always been found between different sterilizers of the same milk. Very slight changes in temperature or time will appreciably affect the viscosity of the milk, and any errors in the measurement of temperature may cause the milk to coagulate, since it is desired to bring the milk as nearly as possible to the coagulating point without permitting its temperature to pass that point.

Another difficulty encountered in the sterilization of milk by the method of cooking samples and then attempting to duplicate the process applied to the sample has been found in the changes which the milk undergoes between the time when the first part of a batch is sterilized, and the time when the last part of the batch is sterilized, which may be several hours later. The latter sterilization from a batch of milk may be found to coagulate completely, although identically the same process of treatment is applied thereto as was given to the first sterilization of the same batch of milk.

It has likewise been well known among those skilled in the sterilization of milk products that it is frequently impossible to duplicate the viscosity in different sterilizers of the same milk, although the temperature and time used are known to be identical within the limits of practical regulation.

Upon investigating the causes of this irregularity in sterilization, I find that the production of viscosity in milk during the process of sterilizing does not take place steadily, but occurs in two or more separate stages, and that when the first formation of viscosity begins, the milk does not thereafter change in temperature in like ratio to the change of temperature of the steam in the sterilizer. On the contrary, the temperature of the milk has a tendency to lag behind the steam temperature, so that slight changes in the time of the beginning of body formation within the milk will greatly influence the temperature lag of the milk behind the steam temperature, and will, consequently, also greatly influence the final temperature of the milk.

Since it is desirable to sterilize all of the milk to a certain definite viscosity, it is evident that a continuous indication of viscosity throughout the sterilizing process will permit the stopping of the operation of such process at the same point in all of the sterilizers, and will result in the production of a uniform product, regardless of changes which may take place in the viscosity of the milk, and regardless, also, of the indicated differences of time and temperature in sterilizing.

In Figure 4 of the drawings I have disclosed an embodiment of apparatus whereby the above noted disadvantageous features of prior processes of sterilizing milk, or otherwise chemically processing liquids or liquiform food products may be wholly overcome. In this arrangement a can of the food product to be tested, indicated at 14, such, for instance, as milk, is rotated bodily within an auto-clave, the wall of which is represented at 15. A stuffing box 16, of suitable construction, is placed in this wall, and a hollow or tubular shaft 17 extends therethrough. The inner end of this shaft 17 is curved, as shown and carries the viscosimeter 18. The can or container 14 has a removable top 19 fixed to the end of the shaft 17. This can has the same capacity and wall thickness, and therefore, the same heat conductivity as the can which is regularly used for the packing of the product. The viscosimeter includes a solenoid and magnet, as formerly described, the magnet being of the type shown in Figure 2, and provided with a hollow float 9. The wires 20 extend from the terminals of the solenoid through the hollow shaft 17, and are connected to the commutator rings 21 on the outer end of said shaft. These rings are engaged by the brushes 22, and from these brushes the wires 23 lead to the indicating instrument. For the purpose of limiting the movement of the magnet in one direction with respect to the solenoid an arm 24 is fixed to one side of the solenoid, and has its free end inwardly curved. This end of the arm serves as a stop with which the float 9 of the magnet is adapted to engage.

In the use of this last-described apparatus the can having the removable top is filled with the product, for instance, milk, which is a sample from the batch being sterilized at the same time. The can is then secured upon the end of the shaft 17, and said shaft rotated either by externally applied power, or by suitable mechanical connections with a rotating part within the sterilizer. At each half turn of the can carrying the viscosimeter within it, the magnet having the float falls through the hole in the solenoid. Since the rotation of the can is comparatively slow in the sterilization of the product, an appreciable time elapses, during which the magnet has an opportunity to fall freely though slowly through the core of the solenoid. During this passage of the magnet into the solenoid core an electromotive force, depending upon the particular viscosity of the product, is generated, and this current so generated is measured by the indicating instrument, which may be placed in some suitable location remote from the sterilizer for observation. At the end of the next half turn of the cam 14 the magnet falls in the opposite direction, and if, as noted above, it formerly dropped into the solenoid core, it will now drop out of the core to the extended position shown in the drawing, and until the float 9 contacts with the stop or arm 24. The same electromotive force will be produced in the solenoid, but in the opposite direction, and it will be understood that the galvanometer is of that type which will measure current, passing in either direction.

In many instances the D'Arsonval type of galvanometer is suitable, since the indicating pointer works in one direction for a current passing in one direction, and in the next half turn of the viscosimeter it will swing to a like extent in the opposite direction. This type of measuring instrument also has the advantage of being "dead beat," so that there is no pendulum effect which would interfere with the accuracy of the individual indication. As the sample of the product in the rotating can undergoes changes in viscosity, these changes are indicated by the galvanometer, and the observer may ascertain with great accuracy and certainty from reading the galvanometer, the extent of increase in viscosity, and the exact time when such increase takes place in the sterilizing process. He may, therefore, control the process accordingly, and in this manner secure absolute uniformity in the resultant product.

The disc magnet of the viscosimeter may be one of two different forms, thus the magnet may carry a simple disc for liquids having a certain known range of viscosity, the resistance to the passage of such disc through the liquid being the measure of viscosity. In such case the E. M. F. generated is less, as the viscosity increases. On the other hand this disc may be replaced by a hollow body of more or less spherical shape, which will rise in the body of liquid, owing to its buoyancy. In this case the magnet disc serves as a float which rises either out of or into the solenoid, depending upon the position of the solenoid in its bodily rotation. This float type of the magnet disc is preferable in liquids which are constantly undergoing an increase in temperature during the process of treatment, since changes in viscosity will not then be offset by the effects of increase in temperature. I use this type of magnet disc preferably for the continuous indicating viscosimeter employed in the control of the process for the sterilization of milk products.

In the processing of certain food products, and particularly in the sterilization of milk, it is highly desirable that the operator should have constant knowledge of the increase in temperature of the product, and in Figure 5 of the drawings I have shown a slightly modified form of the apparatus seen in Figure 4, whereby a continuous and concurrent indication of both the temperature and the viscosity of the product undergoing treatment may be produced. The mounting and arrangement of the viscosimeter is precisely the same as that previously indicated, but in addition thereto, a thermo-couple 25 is either enclosed within the solenoid jacket or casing, or is encased in a separate protective shell adjacent to the solenoid. The thermo-couple wires 26 extend through the tubular shaft 17, and are connected to the additional commutator rings 27 on the outer end of said shaft, with which rings the current-conducting brushes 28 are engaged. Wires 29 lead from these brushes to a potentiometer or millivolt meter, which instrument may be placed near the galvanometer, which indicates the viscosity of the product. Through the means of the thermo-couple the potentiometer or other indicating instrument is thus caused to continuously indicate the temperature of the sample of material being tested. The operator will then have indicated not only the viscosity of the material undergoing treatment, but its temperature at the same time, and thus has complete information as to the changes going on within the sample of the product being treated in the autoclave, having before him means whereby a comparison may be made between the temperature and viscosity of the sample at any time during the processing operation, which operation may be stopped at the proper time in order to insure the attainment of the complete sterilization of the product without effecting coagulation thereof.

The several modifications of the electrical viscosimeter herein described may be used as indicating or recording instruments. Where only indications of viscosity are desired, a suitable galvanometer such as a D'Arsonval is used. Such an instrument gives an indication of viscosity at each half revolution of the viscosimeter and since these indications are generally at intervals of a few seconds, the instrument is in fact a continuous indicating instrument. If a record of the changing viscosity is desired a recording galvanometer is used, such a recording instrument as that commonly used for recording potentiometer readings or for recording temperatures by means of changes in resistance may be employed. Such apparatus for recording galvanometer reflections is standard and well known in the art so that further description here is unnecessary.

The continuous indicating type of viscosimeter is also adapted to the continuous measurement of viscosity, or viscosity and temperature of the material in bulk while undergoing treatment in an auto-clave or similar equipment. I have, therefore, shown in Figure 6 of the drawings another adaptation of the apparatus, which differs from the arrangement shown in Figure 5, in that the can or container for holding a test sample is omitted, and the solenoid and magnet either with or without the thermo-couple, are rotated by the shaft 17 within the auto-clave through the bulk of the material being processed. The viscosimeter and thermo-couple may be caused to rotate at any desired speed which may be most convenient to enable the operator to take the readings from the indicating instruments through the means of the worm gear 30, fixed upon the outer end of the shaft 17, which is driven from a motor or other source of power. As the shaft 17 is rotated, the magnet drops into or out of the solenoid, and causes the galvanometer to indicate the viscosity of the liquid at the instant of the passage of the magnet through the liquid, which, of course, indicates the viscosity of the mass which is undergoing treatment. Simultaneously the thermo-couple will give an accurate indication of the temperature of the material in the auto-clave.

In Figures 7 and 8 of the drawings I have disclosed still another adaptation of apparatus in which the principle of operation is the same as referred to in the preceding description, but wherein a different means is provided for actuating the solenoid magnet. In this arrangement the solenoid coil 31 is fastened rigidly to the wall of the autoclave, and upon the inner end of the shaft 32 rotatably mounted in said wall a cam element 33 is fixed. This cam is adapted to engage the under side of the magnet disc 8' to move the magnet out of the solenoid core. The cam, after passing out of contact with the disc 8', permits the magnet to drop freely back into the solenoid, which operation occurs in each revolution of the cam. Thus it is seen that the cam 33 serves as a mechanical means to move the magnet in one direction, whereas its movement in the opposite direction is resisted solely by the viscosity of the liquid. The shaft 32 is provided on its outer end with the gear 34, to which an electric motor or other power means is operatively connected. In this adaptation no commutator is required, since the wires 35 of the solenoid are led outwardly from a fixed solenoid through the wall of the auto-clave, instead of from a moving solenoid. The thermo-couple for simultaneously measuring the temperature of the liquid need not necessarily be an integral part of this arrangement, but can be placed through the wall of the auto-clave at any convenient location. In this arrangement the viscosity of the liquid will be indicated continuously at any desired intervals according to the speed of rotation of the cam element 33. Thus, for convenience the viscosimeter can be caused to give such indications at intervals of one or two seconds, and the series of such indications will constitute a continuous indication of the changes in viscosity in the liquid during the period of processing.

From the foregoing description considered in connection with the accompanying drawings, the several embodiments of apparatus and methods involved in the operation thereof will be clearly and fully understood.

I am aware of the fact that viscosimeters have been more or less generally employed for the purpose of indicating the viscosity of liquids, but I believe that the viscosimeter disclosed in this application controlling the operation of an electrical indicating instrument to be new and original. Also, in so far as I am aware, the use of a thermocouple within an auto-clave or other container for the liquid being processed to thereby indicate or record variations in temperature, is new.

The sensibility of the galvanometer for indicating viscosity may be made very great, and consequently, it is possible to use in connection with such an instrument, a solenoid and magnet of very small dimensions, and yet produce a current of sufficient intensity for the accurate measurement of viscosity. This permits of the use of the viscosimeter in a very small space when economy of space is an essential consideration. Thus, for instance, the viscosity of the liquid contained within a small can, such as is used in marketing the product, can be accurately indicated. Since the means for indicating viscosity is electrically controlled, the indicating instrument need not be placed contiguous to the viscosimeter, but can be arranged at any desired remote location. Further, this new type of viscosimeter is adaptable for the measurement of viscosity in the moving or rotating can. It will also be noted that the use of the viscosimeter in any of its several embodiments herein illustrated, involves no extensive alterations in the structure of the auto-clave or other equiment employed in the processing of the liquid.

Finally, it will be observed that the apparatus employed is quite simple in its construction and arrangement, and will, therefore, be very reliable in operation, and not liable to get out of order. This apparatus, is not however, specifically claimed in the present application as it will be made the subject matter of a separate and independent application for patent.

The method of indicating or recording viscosity, and also the method of indicating or recording variations in temperature of the liquid being treated is not to be considered as limited in its adaptation or use to any one of the several forms of apparatus which I have herein disclosed, since it is manifest that the apparatus is susceptible of further exemplification in other structural forms and arrangements. Accordingly, it is to be understood that the privilege is reserved of resorting to such further changes and modifications in the form, construction and relative arrangement of the several parts of the apparatus as may be fairly embodied within the spirit and scope of the invention as claimed.

I claim:—

1. The method of indicating at short intervals of time the viscosity of liquiform material undergoing chemical treatment in an autoclave or the like, which consists in causing a body to move through the material for generating an electromotive force proportional to the time rate of said movement, and measuring in units of viscosity the electromotive force and consequently the time rate of passage of said body through the material.

2. The method of indicating at short intervals variations in viscosity of liquiform materials which consists in bodily rotating a mass of material and an electrical current generating means as a unit and causing the material to resist the generation of an electromotive force in inverse ratio with the viscosity of the material and converting such variable electromotive force into units of measurement of the viscosity of the material.

3. The method of indicating the viscosity of liquiform materials which consists in arranging a viscosimeter having a movable part within a rotatable container for the material and bodily rotating the container and the viscosimeter as a unit, the movement of said movable part of the viscosimeter through the material in the container generating an electromotive force, and such movement being resisted solely by the viscosity of the material, whereby the electromotive force is varied in proportion to the variations in the viscosity of the material, and electrically connecting the viscosimeter with an indicating instrument.

4. In the processing of liquiform products, bodily rotating a mass of the product with a viscosimeter immersed therein to thereby cause a part of the viscosimeter to move through the product in the rotation thereof, and measuring at short intervals variations in the resistance offered by the rotating mass of the product to the movement of said part.

5. In the processing of liquiform products, bodily rotating a mass of the product, together with a viscosimeter immersed therein, the viscosimeter including a movable part generating an electromotive force, and the movement of said part being resisted by the viscosity of the material, whereby the electromotive force of the current is varied in inverse proportion to the varying viscosity of the material and electrically connecting the viscosimeter to an indicating instrument whereby indications of the viscosity of the rotating mass of product are given at short intervals.

In testimony that I claim the foregoing as my invention, I have signed my name.

GEORGE GRINDROD.